(12) United States Patent
Bondurant et al.

(10) Patent No.: US 8,654,525 B2
(45) Date of Patent: Feb. 18, 2014

(54) CLIPS AND LATCH TO RECEIVE A COMPUTING COMPONENT

(75) Inventors: Thomas Aaron Bondurant, Fort Collins, CO (US); Earl W Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 13/364,508

(22) Filed: Feb. 2, 2012

(65) Prior Publication Data

US 2013/0201626 A1    Aug. 8, 2013

(51) Int. Cl.
    *G06F 1/16*    (2006.01)
(52) U.S. Cl.
    USPC ............ 361/679.58; 361/679.37; 248/221.11; 29/428
(58) Field of Classification Search
    USPC .................. 361/679.58, 679.37, 679.38; 248/211.11; 29/428, 825
    See application file for complete search history.

(56) References Cited

U.S. PATENT DOCUMENTS

| | | | |
|---|---|---|---|
| 5,278,730 A * | 1/1994 | Kikinis .................... | 361/679.32 |
| 5,340,340 A * | 8/1994 | Hastings et al. ................. | 439/64 |
| 5,564,804 A | 10/1996 | Gonzalez et al. | |
| 5,717,571 A | 2/1998 | Helot | |
| 6,040,980 A | 3/2000 | Johnson | |
| 6,252,766 B1 | 6/2001 | Radloff | |
| 6,452,792 B1 | 9/2002 | Chen | |
| 6,643,139 B2 * | 11/2003 | Tien .............................. | 361/727 |
| 6,680,843 B2 | 1/2004 | Farrow et al. | |
| 6,751,093 B1 * | 6/2004 | Hsu et al. .................. | 361/679.33 |
| 6,918,174 B2 | 7/2005 | Kim et al. | |
| 6,954,940 B2 | 10/2005 | Hsu | |
| 6,992,886 B2 * | 1/2006 | Salinas et al. ............ | 361/679.38 |
| 7,016,190 B1 | 3/2006 | Chang | |
| 7,054,153 B2 | 5/2006 | Lewis et al. | |
| 7,088,579 B1 | 8/2006 | Konshak | |
| 7,453,707 B2 | 11/2008 | Beall et al. | |
| 7,457,110 B2 * | 11/2008 | Lo et al. .................... | 361/679.33 |
| 7,483,268 B1 * | 1/2009 | King et al. ............... | 361/679.38 |
| 7,675,741 B2 * | 3/2010 | Tanaka ...................... | 361/679.02 |
| 7,715,184 B2 * | 5/2010 | Yang ........................ | 361/679.37 |
| 7,782,603 B2 | 8/2010 | Curnalia et al. | |
| 7,839,629 B2 * | 11/2010 | Yeh .......................... | 361/679.37 |
| 7,983,032 B2 | 7/2011 | Walker et al. | |
| 8,064,196 B2 * | 11/2011 | Furuta ...................... | 361/679.37 |
| 8,379,380 B2 * | 2/2013 | Zhang ...................... | 361/679.33 |
| 8,405,968 B2 * | 3/2013 | Chen ........................ | 361/679.33 |
| 2007/0014085 A1 * | 1/2007 | Meserth et al. ................ | 361/685 |
| 2007/0070595 A1 * | 3/2007 | Chen et al. .................... | 361/685 |
| 2007/0103857 A1 | 5/2007 | Weech et al. | |
| 2010/0079936 A1 | 4/2010 | Bridges et al. | |

OTHER PUBLICATIONS

Cooler Master CM 690 II Advanced Case (Web Page), May 7, 2010, http://www.hardwareheaven.com/reviews/972/pg5/cooler-master-cm-690-ii-advanced-case.

* cited by examiner

*Primary Examiner* — Lisa Lea Edmonds
(74) *Attorney, Agent, or Firm* — Aaron S. Ward (57) ABSTRACT

A carrier is mountable to a component, and includes first tabs and second tabs. Clips and a latch are associated with a compartment of a computing system. The clips are to receive the first tabs, and the latch is to receive the second tabs, to isolate the carrier from movement in three dimensions.

15 Claims, 8 Drawing Sheets

CLIPS AND LATCH TO RECEIVE A COMPUTING COMPONENT

BACKGROUND

Components of a computing system may be serviceable, including removal and replacement of a component. However, servicing a component may be associated with tool usage and time consuming and/or delicate work on the computing system.

DETAILED DESCRIPTION

A mounting system according to various examples may enable rapid installation and/or removal of a component (e.g., a storage component such as a hard disk drive (HDD)) to/from a computing system (e.g., notebook). The mounting system may enable rapid and tool-less installation and removal, even when using gloves, while providing a robust and stable platform for mounting the component and isolating movement of the component in three dimensions. The mounting system may be integrated into a computing system, and may be added as a retrofit that complies with any constraints of an existing computing system (e.g., component compartment space, chassis features, and so on).

A component using an example mounting system may be easily replaced, and may be easily removed from a computing system to be secured in a location remote from the computing system. A mounting system may enable swapping between different storage components having corresponding secure/insecure access privileges (e.g., enabling access to different information and/or networks based on the storage component). Thus, a computing system may be moved easily from a secure environment to an insecure environment by, for example, swapping out a high-security HDD with an unsecure HDD, securing the high-security HDD in the secure environment.

An example mounting system may include a carrier, clips, and a latch. The carrier may be mountable to a component, and may include first tabs and second tabs. The clips may be associated with a compartment of a computing system to receive the first tabs of the carrier. The latch may be associated with the compartment, to receive the second tabs and isolate the carrier from movement in three dimensions.

Figure 1:
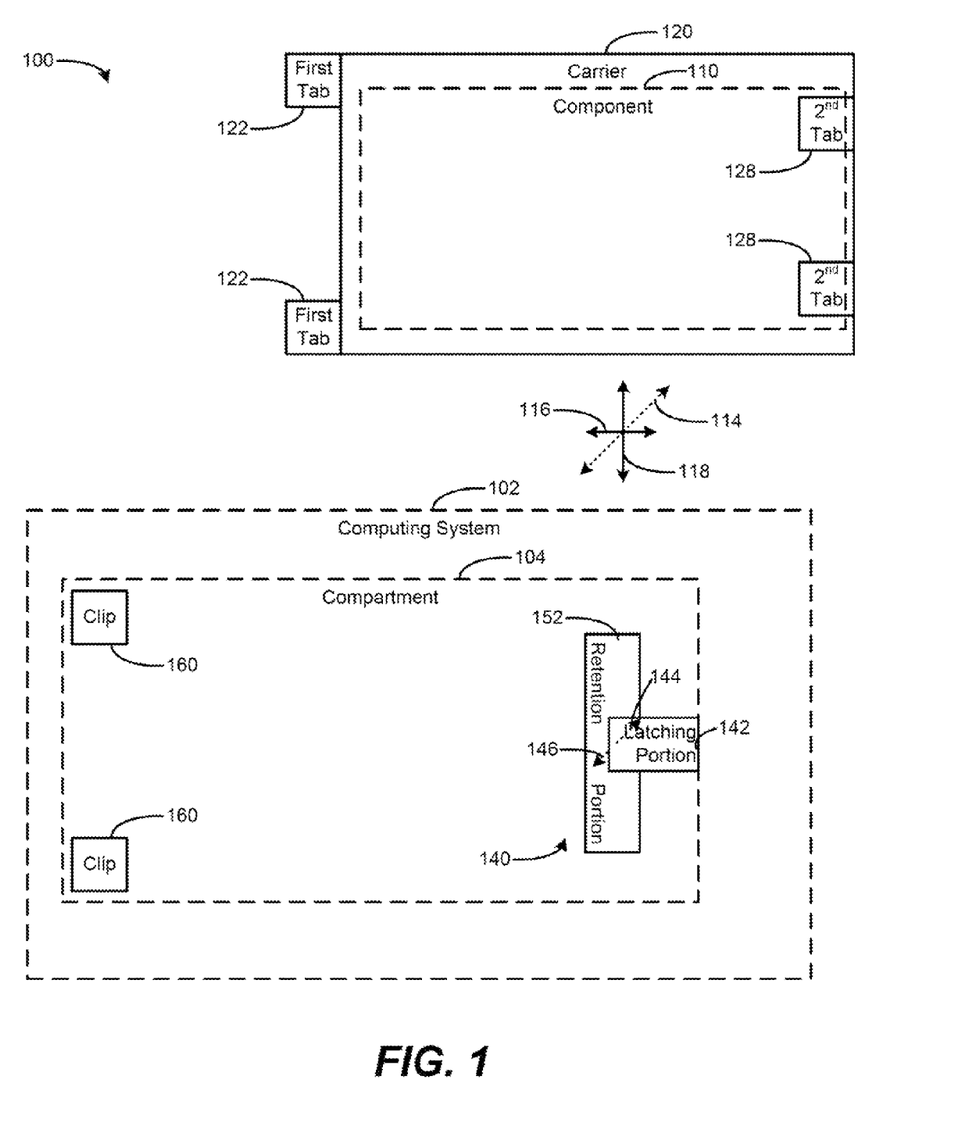
FIG. 1 is a block diagram of a mounting system according to an example.

FIG. 1 is a block diagram of a mounting system 100 according to an example. Mounting system 100 may include a carrier 120 mountable to a component 110, and a latch 140 and plurality of clips 160 associated with a compartment 104 of a computing system 102. The carrier 120 may include a plurality of first tabs 122 and a plurality of second tabs 128. The latch 140 may include a latching portion 142 and a retention portion 152.

The carrier 120 may be mountable to a component 110, such that the component 110 is secured from movement relative to the carrier 120. The carrier 120 may be mountable to components 110 such as a hard disk drive (HDD), a solid state disk (SSD), an optical drive, a battery, networking and communication components, security devices, and other components to be interfaced with computing system 102. The carrier 120, along with component 110, may be mounted to the computing system 102 via latch 140 and clips 160.

Latch 140 and clips 160 may be formed as an integral portion of compartment 104 of computing system 102, and also may be formed separately and installed into the compartment 104. The carrier 120, latch 140, and clips 160 may be metal, plastic, resin, laminates, or other materials having desirable features such as flexibility, strength, ease of manufacturing, etc. In an example, the latch 140 and clips 160 are formed of sheet metal and fastened to the compartment 104. Latch 140 and clips 160 may be mountable to the compartment 104 without the use of fasteners. For example, the latch 140 and clips 160 may slidably fit in slots of the compartment 104, retained without the use of separate fasteners, e.g., by a friction fit that may be based on a latching engagement between the latch 140 and/or clips 160 and the compartment 104. In an example, a latch 140 and clips 160 made of sheet metal may be assembled with the compartment 104 by being snapped into place. In another example, the latch 140 and clips 160 may be assembled with the compartment 104 based on fasteners such as screws. Thus, example mounting systems using latch 140 and clips 160 may be retrofitted to an existing computing system that is not specifically tailored for the latch 140 and clips 160. Mounting systems may be integral to newly designed computing systems, and may utilize secondary bays or other compartments of the computing system that may receive latch 140 and clips 160.

The carrier 120 may be received at the latch 140 and clips 160 based on a first direction 114 and a second direction 116. The first direction 114 is shown as extending in and out of the page in FIG. 1, and the second direction 116 is shown as extending to the left and right of the page in FIG. 1. The first direction 114, second direction 116, and third direction 118 may correspond to three dimensions of motion, e.g., an x-axis, y-axis, and z-axis. In an example, the carrier 120 associated with component 110 is inserted along the first direction 114 into the compartment 104 such that the first tabs 122 align with the clips 160, and the second tabs 128 align with the retention portion 152 of the latch 140. Alignment may be associated with deflecting the latching portion 142 of the latch 140 along the first direction 114, from a locked position 144 to an unlocked position 146. The carrier 120 is movable within the compartment 104 along the second direction 116 such that the first tabs 122 are received at the clips 160, and the second tabs 128 are received at the retention portion 152 of the latch 140 and the carrier 120 is locked into place by the latching portion 142 of the latch 140 moving from the unlocked position 146 to the locked position 144.

The first tabs 122, second tabs 128, clips 160, and/or latch 140 may include features that affect interactions, such as curves, lips, ridges, lead-ins, catches, or other features that may provide tolerance/lead-in for alignment, fitment, stacking, avoiding binding, and other benefits. Such features may be located on at least one of the tabs and/or the clips/latch, and are not limited to a particular part. The mounting systems are scalable beyond use with a computing system form-factor, and may be used in larger and/or smaller form-factors due to the scalability, including form-factors such as ultrabooks, netbooks, tablets, smartphones, desktops, servers, all-in-ones, set-top boxes, and other form-factors.

Figure 2:
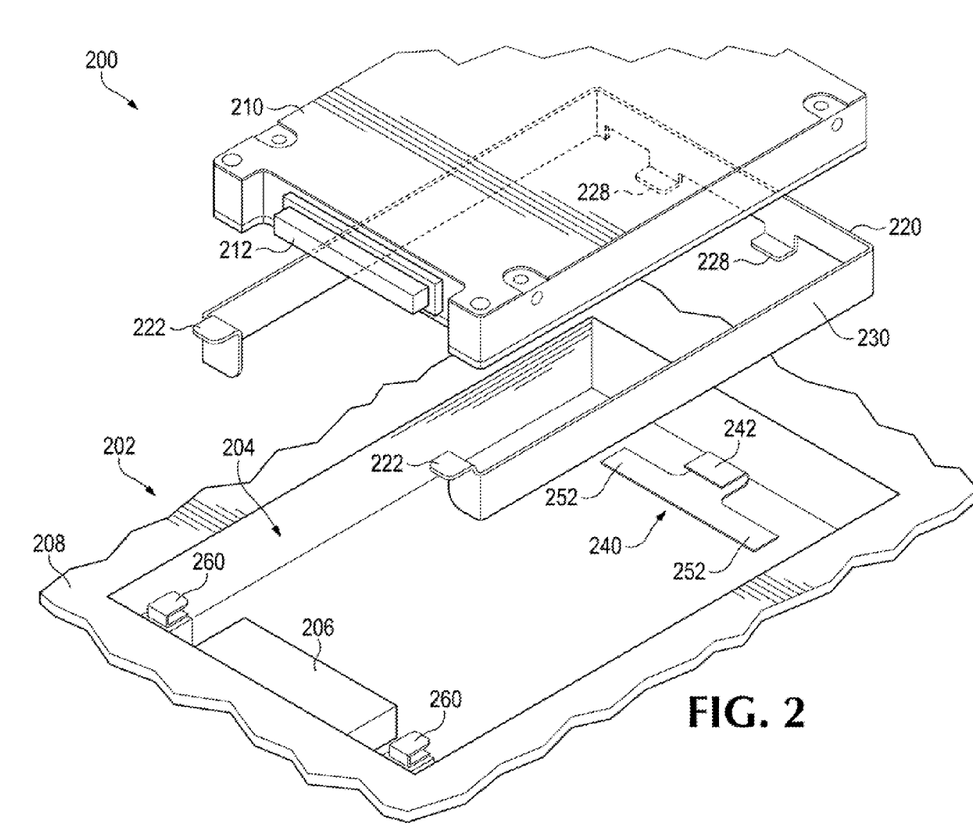
FIG. 2 is a perspective view of a mounting system according to an example.

FIG. 2 is a perspective view of a mounting system 200 according to an example. The mounting system 200 includes a carrier 220, clips 260, and latch 240. The carrier 220 is mountable to a component 210 that is insertable into compartment 204 of computing system 202.

The example carrier 220 includes a plurality of first tabs 222 and a plurality of second tabs 228. Two first tabs 222 and two second tabs 228 are shown, although example mounting systems may use a different number of tabs. The tabs are associated with the carrier 220, although other examples may involve tabs associated with the compartment 204 that are received at the carrier 220. The first tabs 222 and the second tabs 228 are to engage the clips 260 and latch 240, and may be positioned on the carrier 220 to avoid interference with the component 210 when mounted to the carrier 220.

The carrier 220 may be mounted to the component 210 via a friction fit and/or fasteners. The example carrier 220 includes side walls 230 corresponding to sides of the component 210, while providing access to component interface 212. In alternate examples, the carrier 220 may include additional walls, including a floor and/or ceiling, for additional support and/or for fitment with at least one side, bottom, or top of the component 210. The component 210 is shown as an HDD, including mounting holes along sides of the HDD. The side walls 230 of the carrier 220 may include corresponding holes for use with fasteners to mount the component 210 to the carrier 220. In an example, the carrier 220 may be flexible and include latching features (e.g., tabs) to provide a tool-less mounting and retention of the component 210 in the carrier 220. In an alternate example, the carrier 220 may include a sleeve-like structure having a floor and/or cover such that the component 210 is slidable into the carrier 220 to protect at least the top and bottom of the component 210.

The latch 240 is to receive and latch the carrier 220 to isolate movement of the carrier 220 in three dimensions. For example, the latch 240 may isolate the carrier 220 from movement based on an interaction between the latch 240 and the carrier 220, and may provide such isolation without relying on contact between the carrier 220 and walls of the compartment 204. The latch 240 may provide a shock isolation feature whereby shocks to the computing system 202 are damped by the latch 240 and/or the interaction between the latch 240 and the carrier 220.

Examples of the latch 240 may include a latching portion 242 and at least one retention portion 252. The latching portion 242 may be biased upward into a locked position, and may provide spring-loaded support to the carrier 220 along a first direction when the carrier 220 is inserted into the compartment. The latching portion 242 may be deflected downward into an unlocked position by insertion of the carrier 220, such that the second tabs 228 may align vertically to be received at the retention portions 252. Thus, the latching portion 242 of the latch 240 may be positioned at a greater height than the retention portions 252 of the latch 240, thereby enabling the latching portion 242 to deflect vertically to enable spring-loaded alignment between the second tabs 228 and the retention portions 252.

The aligned carrier 220 is movable in a second direction, away from the latch 240 and toward the clips 260 and compartment interface 206. Movement of the carrier 220 along the second direction enables the first tabs 222 of the carrier 220 to be received at the clips 260, and enables the component interface 212 to be received at the compartment interface 206. Further, movement along the second direction enables the latching portion 242 to return to the locked position, latching into place to prevent movement of the carrier 220 along the second direction.

The compartment interface 206 may be fixed to a chassis 208 of the computing system 202 and/or fixed to a wall of the compartment 204. Accordingly, the compartment interface 206 may engage the component interface 212 based on movement of the component 210, without a need to specifically handle the compartment interface 206. Thus, the component 210 may interface with the computing system 202 and be secured in the compartment based on a tool-less insertion and latching between the carrier 220 and the clips 260/latch 240.

The component interface 212 and the compartment interface 206 may be based on an interface such as a Serial Advanced Technology Attachment (SATA), an Integrated Drive Electronics (IDE), or other interface such as a blind mate interface (BMI). A BMI may be associated with a primary slidable axis, that may allow for some misalignment between mating features, and may include a built-in self-alignment, float, tolerance, and other features. The installation movement of the carrier 220 may cooperate with the compartment interface 206 and the component interface 212 to protect the interfaces by providing installation based on movement along the direction of an interfacing axis (e.g., a linear mating direction such as the second direction). In alternate examples, the compartment interface 206 and the component interface 212 may be based on other interfacing movements, such as pivoting, rocking, curved paths, and others based on mounting system and/or computing system geometry, and/or path of travel of the mating components.

Figure 3:
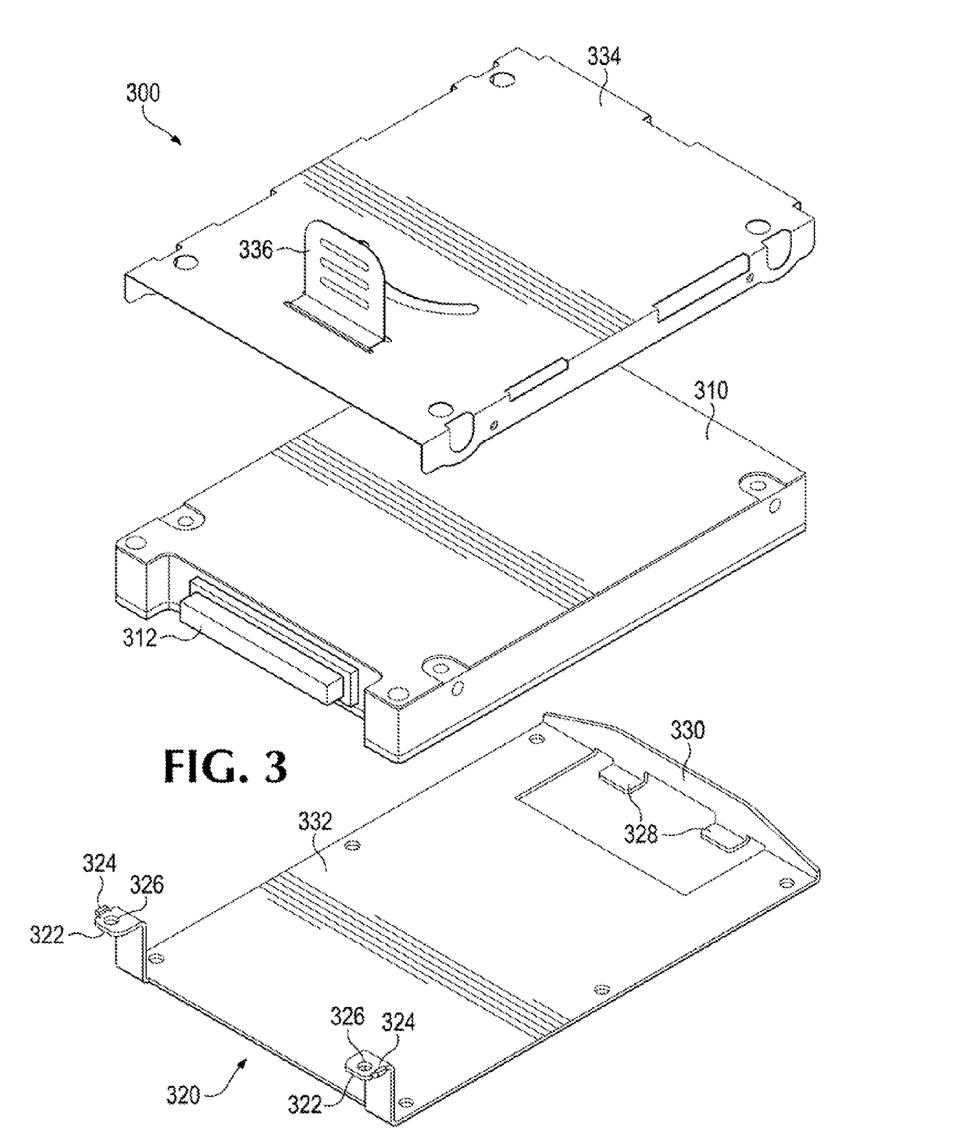
FIG. 3 is a perspective view of a mounting system including a carrier and cover according to an example.

FIG. 3 is a perspective view of a mounting system 300 including a carrier 320 and cover 334 according to an example. The example carrier 320 includes sidewall 330 and floor 332 for mounting the component 310 without blocking component interface 312. The floor 332 includes passages for screws to be mounted to a bottom of the component 310. The carrier includes first tabs 322 and second tabs 328.

The first tabs 322 may include tab receptacles 326 and tab ridges 324. The tab receptacles 326 may interact with clips, clip fasteners, and/or other features of a compartment to receive the carrier 320. In an example, a portion of the chassis may provide a protrusion upward into a clip to engage the tab receptacles 326 when inserted into the clips. The tab ridges 324 may interact with side edges of the clips to provide lateral alignment between the carrier and the clips.

Cover 334 may be provided as a separate component, and may be provided as part of or integrated with the carrier 320 and/or the component 310. In an example, the cover 334 may be mountable to the component 310. In an alternate example, the cover 334 may be mountable to sidewalls of a carrier having corresponding sidewalls (e.g., carrier 220 shown in FIG. 2). In another example, the cover 334 may be integral to the carrier 320 such that the carrier 320 is formed as a sleeve with the cover 334 providing a top of the carrier 320. The cover 334 may protect the component 310, including addressing thermal heat transfer to/from the component 310, acoustic noise from the component 310, and electrical noise from the component 310. The carrier 320 similarly may address such issues. The cover 334, carrier 320, and other components accordingly may be formed of materials to address such issues, including metals such as aluminum for heat transfer. The handle 336 may provide a grip to facilitate movement of the carrier 320. The handle 336 may be flexible, and may be formed of mylar, fabric, a label material, or other materials to aid in gripping the handle 336 and inserting/removing the cover 334, component 310, and/or carrier 320.

Figures 4, 5:
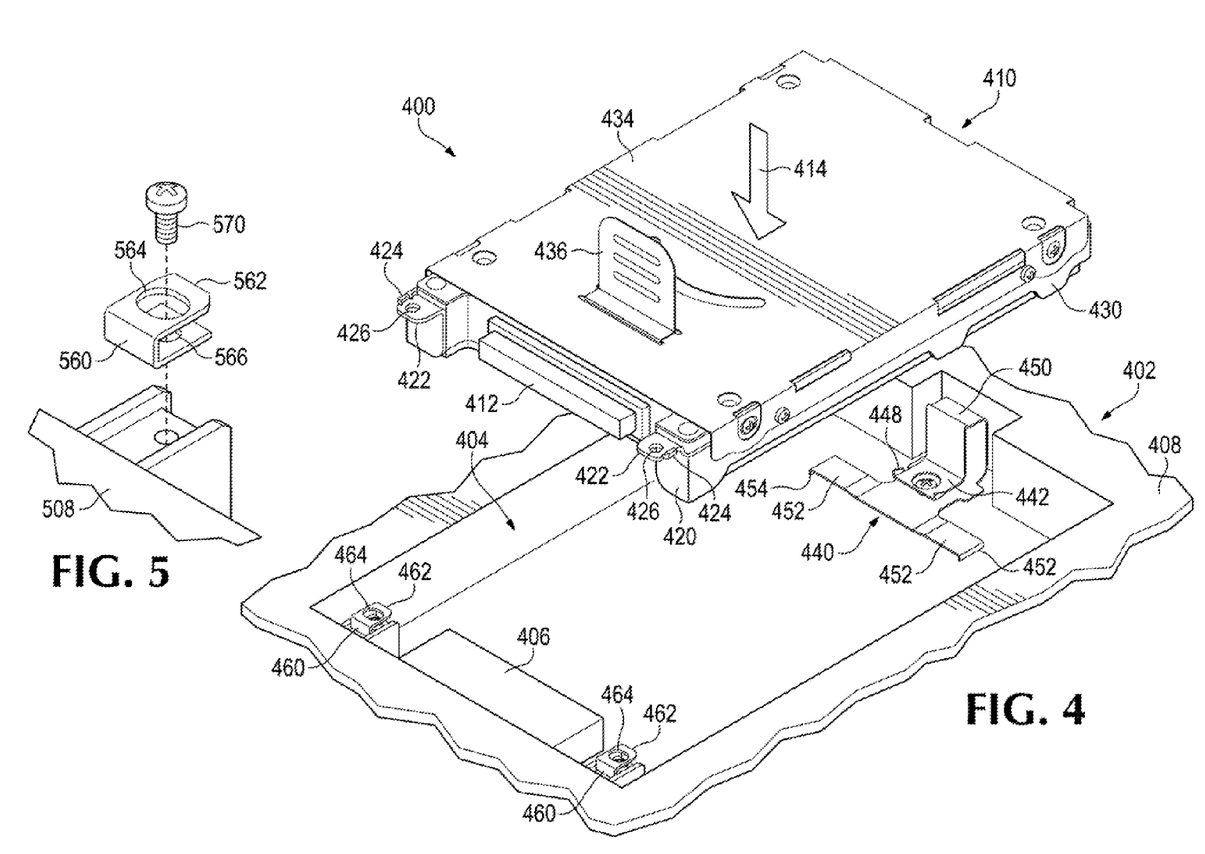
FIG. 4 is a perspective view of a mounting system including a carrier insertable in a compartment according to an example.
FIG. 5 is a perspective view of a mounting system including a clip and fastener according to an example.

FIG. 4 is a perspective view of a mounting system 400 including a carrier 420 insertable in a compartment 404 according to an example. The carrier 420 is mounted to a component 410 and cover 434. The carrier 420 is insertable into the compartment 404 of the computing system 402 along a first direction 414. Insertion along the first direction 414 may be accomplished such that the component interface 412 does not interfere with the compartment interface 406, the first tabs 422 do not interfere with the clips 460, and the second tabs of the carrier (not visible in FIG. 4) do not interfere with the latch 440. In an example, the component 410 is insertable such that surfaces of the component 410, carrier 420, and/or cover 434 do not contact the chassis 408 or walls of the compartment 404.

The latch 440 according to the example of FIG. 4 includes a latching portion 442 having a catch 448 and a depressible surface 450, and includes retention portions 452 having retention ridges 454. The depressible surface 450 may include a raised lip to provide an ergonomic interaction area and/or affect the spring-loaded nature of the latching portion 442 if desired (and may be omitted).

The latching portion 442 may be deflectable along the first direction 414 based on contact with the component 410, carrier 420, and/or cover 434. The latching portion 442 also may be deflectable along the first direction 414 based on a force received at the depressible surface 450. Thus, insertion of the carrier 420 along the first direction 414 may cause the latching portion 442 to deflect along the first direction 414 from a locked position (e.g., a default, unbiased position) to an unlocked position (e.g., a biased position wherein the latching portion imparts a spring-loaded force against the component 410, carrier 420, and/or the cover 434). Similarly, applying a force to the depressible surface 450 may deflect the latching portion 442 along the first direction 414 from the locked position to the unlocked position.

The depressible surface 450 of the latch 440 may be positioned at a height along the first direction 414 greater than the retention portions 452 and catch 448. In an example, the depressible surface 450 may extend vertically such that it is flush with a top surface of the chassis 408 and/or a top surface of the cover 434. The latch 440 may include a passage for allowing a fastener to fasten the latch 440 to the compartment 404. In alternate examples, the latch may be integral to the compartment 404 and/or mountable to the compartment without the use of separate fasteners.

Deflecting the latch 440 along the first direction 414 enables alignment between the second tabs (not shown) of the carrier 420 and the retention portions 452 of the latch 440. The retention portions 452 may include retention ridges 454 for lateral alignment between the latch 440 and the carrier 420. Ridges and/or other alignment features may be provided at the latch 440 and/or at the carrier 420 (e.g., on tabs of the carrier), and are not limited to the specific arrangement shown.

A clip 460 may include a passage 464 for allowing a fastener to fasten the clip 460 to the compartment 404, although examples may include integral or non-fastener-based clips 460. Clips 460 may include a lip 462 to facilitate alignment with first tabs 422. Lip 462, tab ridge 424, and other alignment features may be provided at the clips 460 and/or the first tabs 424, and are not limited to clip-only or tab-only applications.

FIG. 5 is a perspective view of a mounting system including a clip 560 and fastener 570 according to an example. The clip 560 is mountable to the chassis 508, and may include a first passage 564 and a second passage 566 for mounting of the fastener 570 perpendicular to a receiving direction of the clip 560. The first passage 564 is wide enough to admit a head of the fastener 570 and a fastening tool (e.g., screwdriver). The second passage 566 is narrower to provide engagement between the head of the fastener 570 and a base of the clip 560. The clip 560 also may include at least one lip 562. The lip 562 may be located on an upper or lower portion of the clip 560, and may provide alignment guidance, tolerance, and/or lead-in for a tab to be inserted in the clip 560 without binding. As with tab ridges, a raised/curved lip 562 may be provided at the clip 560 and/or a tab of a carrier, and is not limited to the clip as shown in the example of FIG. 5. The fastener 570 may be a reduced-diameter screw, head to allow a smaller clearance first passage 564 resulting in additional material to strengthen the clip 560.

Figures 6, 7:
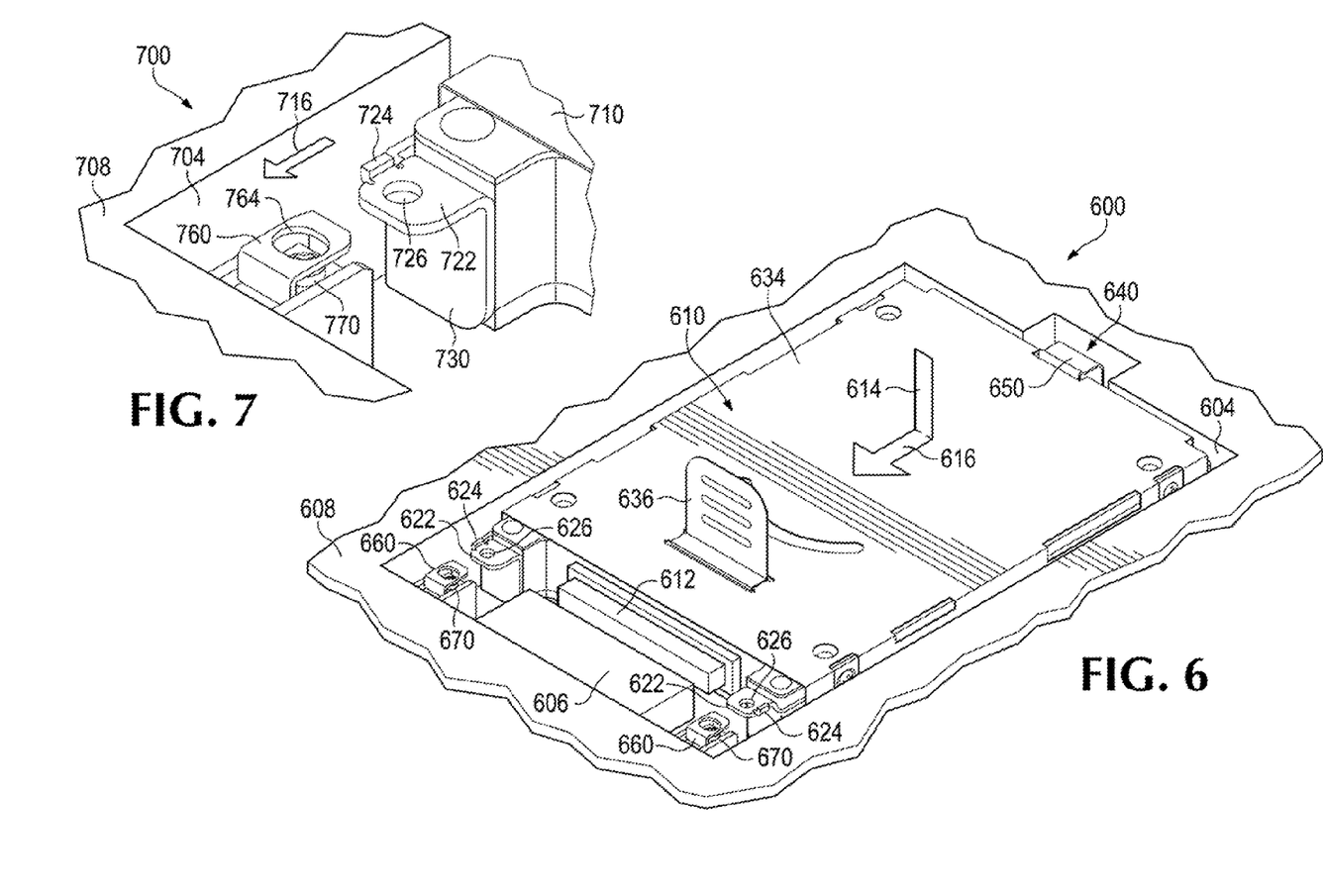
FIG. 6 is a perspective view of a mounting system including a carrier in a compartment according to an example.
FIG. 7 is a perspective view of a mounting system including a first tab and clip in a compartment according to an example.

FIG. 6 is a perspective view of a mounting system 600 including a carrier in a compartment 604 according to an example. The component 610 has been inserted into the compartment 604 along the first direction 614, and is movable in the second direction 616 away from the latch 640 and toward the compartment interface 606.

The cover 634 of the component 610 is shown approximately flush with the chassis 608 and the depressible surface 650 of the latch 640. However, the depressible surface 650 is shown slightly deflected downward along the first direction 614 based on an interaction between the component 610 and the latch 640 to bias the latch 640 in an unlocked position. Although not visible, second tabs of the carrier mounted to the component 610 are aligned with the retention portion of the latch 640 by virtue of the deflection of the latch 640 to the unlocked position and the component 610 (and carrier etc.) not yet being moved along the second direction 616 for engagement. The first tabs 622 similarly are aligned for insertion in the clips 660, including the tab ridges 624 being aligned with sides of the clips 660, and the fasteners 670 being aligned with receptacles 626 of the first tabs 622.

FIG. 7 is a perspective view of a mounting system 700 including a first tab 722 and clip 760 in a compartment 704 according to an example. The component 710 (and carrier) are movable along the second direction 716 so that the first tab 722 may engage the clip 760.

Figures 8, 9, 10:
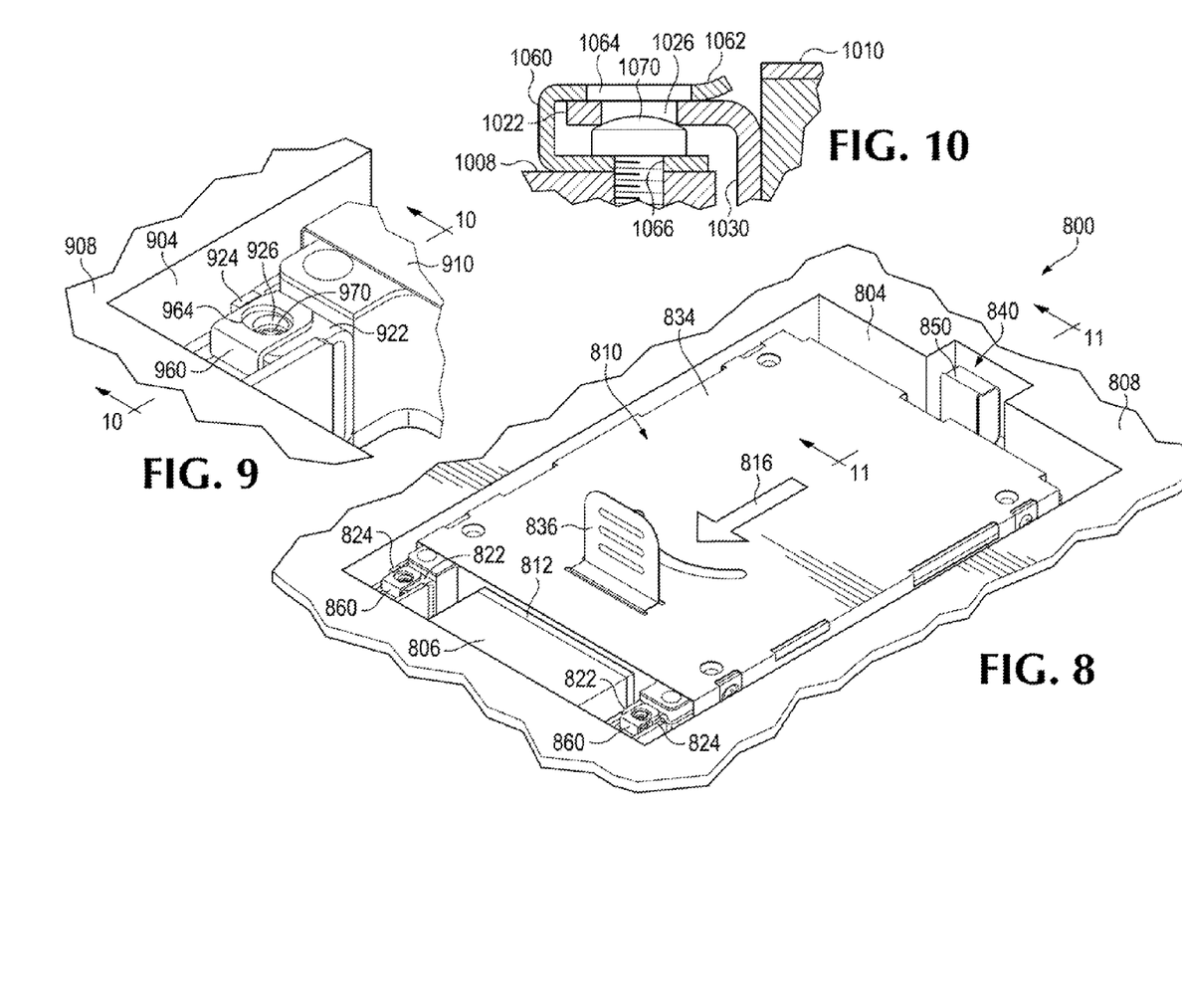
FIG. 8 is a perspective view of a mounting system showing a carrier in a compartment according to an example.
FIG. 9 is a perspective view of a mounting system showing a first tab and clip of a carrier in a compartment according to an example.
FIG. 10 is a side section view taken along line 10-10 of FIG. 9 showing a first tab and clip according to an example mounting system.

FIG. 8 is a perspective view of a mounting system 800 showing a carrier in a compartment 804 according to an example. The component 810 has been moved along the second direction 816 such that the first tabs 822 engage the clips 860, the component interface 812 engages the compartment interface 806, and the latch 840 assumes a locked position (e.g., a default position, including a non-biased and/or non-deflected position) associated with depressible surface 850 raised upward. The component 810 has been moved away from latch 840 along an axis of the component interface 812 and compartment interface 806 (i.e., along the second direction 816), providing a space between a wall of the compartment 804 and an end of the component 810 facing the latch 840. The handle 836 is foldable downward, flush with the cover 834 of the component 810. The latch 840 in the locked position opposes movement of the component 810 (and carrier etc.) along the second direction 816, such that the component 810 is securely isolated from movement in all three dimensions.

FIG. 9 is a perspective view of a mounting system showing a first tab 922 and clip 960 of a carrier in a compartment 904 according to an example. The first tab 922 is inserted into the clip 960, such that clip fastener 970 is visible through the first passage 964 and receptacle 926 of the first tab 922. The tab ridge 924 is engaged with a side of the clip 960.

FIG. 10 is a side section view taken along line 10-10 of FIG. 9 showing a first tab 1022 and clip 1060 according to an example mounting system. The component 1010 is in an inserted/engage position. The clip 1060 may be flexible to grip the first tab 1022 between an upper portion of the clip 1060 and an upper surface of the fastener 1070. The fastener 1070 is shown with a domed head, and the tab receptacle 1026 of the first tab 1022 may be dimensioned to grip the head of the fastener 1070. The lip 1062 is shown with an upward curvature, and may facilitate insertion of the first tab 1022 and flexing of the clip 1060. Accordingly, the clip 1060 may provide a friction fit for the first tab 1022, and provide tactile feedback, such as a click or snap into position, for the sliding motion of the carrier, component 1010, and/or first tab 1022. In examples where the fastener 1070 is omitted or the clips 1060 are integrated with the chassis 1008, a raised surface may be provided in place of where the head of the fastener 1070 would otherwise be, to enable the tactile feedback associated with the friction fit of the first tab 1022 and the clip 1060.

Figures 11, 12:
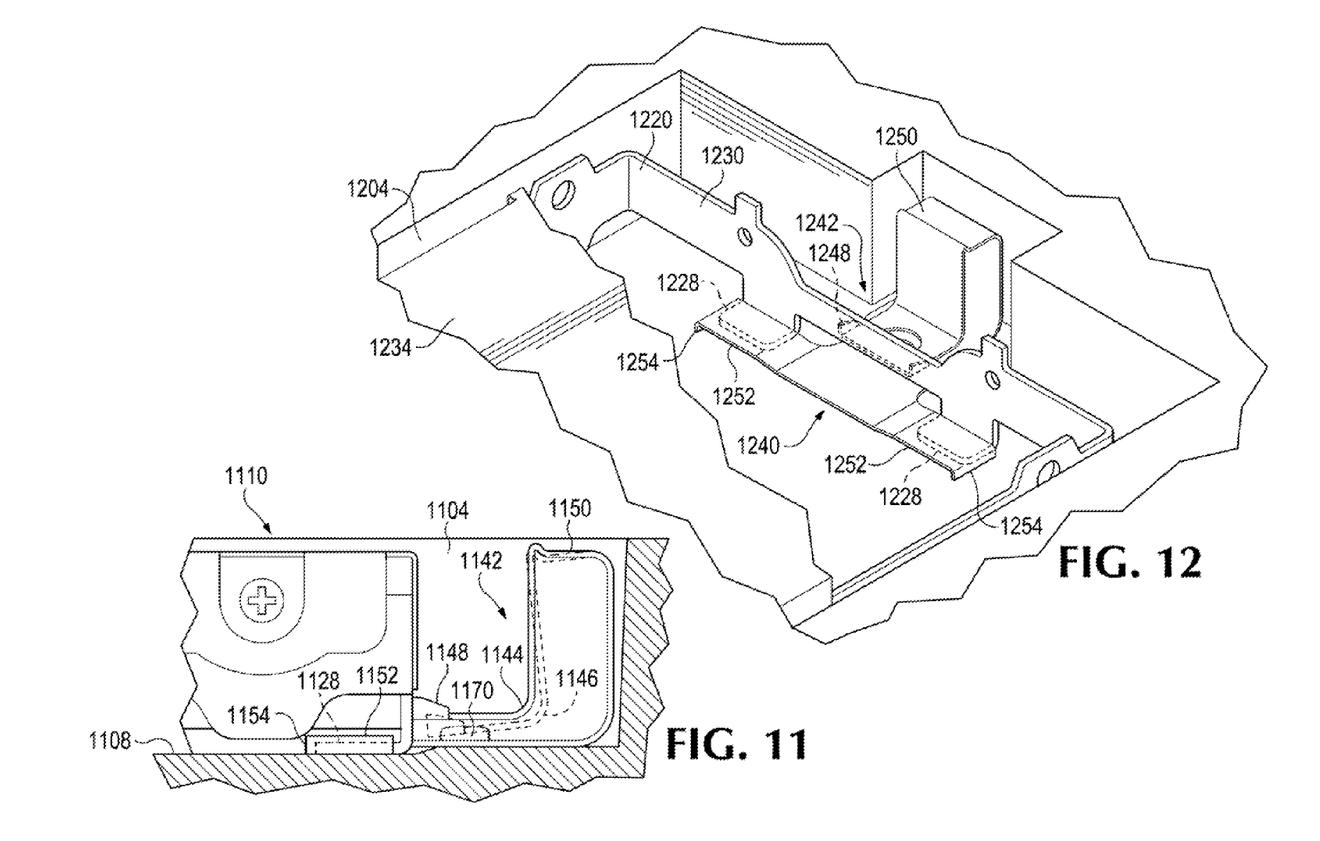
FIG. 11 is a side section view taken along line 11-11 of FIG. 8 showing a latch according to an example mounting system.
FIG. 12 is a perspective view of a mounting system including a latch and carrier in a compartment according to an example.

FIG. 11 is a side section view taken along line 11-11 of FIG. 8 showing a latch according to an example mounting system. The component 1110 is shown in an installed position, moved along the second direction to enable a latching portion 1142 of the latch to assume the locked position 1144. Accordingly, the catch 1148 is engaged with the carrier and/or component 1110 to prevent motion along the second direction. The second tabs 1128 of the carrier are engaged with the retention portion 1152 of the latch, and the retention ridge 1154 is engaged with a side of the second tab 1128. Thus, a single latch may isolate the carrier from movement in all three dimensions. For example, the latch may prevent movement along the first direction due to the retention portions 1152, prevent movement along the second direction due to the catch 1148, and prevent movement along a third direction due to the retention ridges 1154.

The example of FIG. 11 also shows a fastener 1170 to secure the latch 1140 to the chassis 1108, although other techniques described above may be used to secure the latch to chassis 1108 and/or the compartment 1104 (and the latch may be integral with the chassis 1108 and/or compartment 1104). Dashed lines also show the unlocked position 1146 of the latching portion 1142, including deflection of the catch 1148 and depressible surface 1150.

FIG. 12 is a perspective view of a mounting system including a latch 1240 and carrier 1220 in a compartment 1204 according to an example. The carrier 1220 is in a latched position, wherein a sidewall 1230 is locked by the latching portion 1242 of the latch 1240. The second tabs 1228 are engaged with the retention portions 1252 and retention ridges 1254.

As illustrated in dashed lines, the catch 1248 of the latching portion 1242 may prevent the side wall 1230 of the carrier 1220 from movement along the second direction. Additional portions of the latching portion 1242, e.g., an edge of the latching portion 1242, also may engage the carrier 1220 when positioned in the locked position. Force may be applied to the depressible surface 1250 to disengage the latching portion and 1242 and enable the carrier 1220 to be movable along the second direction toward the latch 1240.

Figure 13:
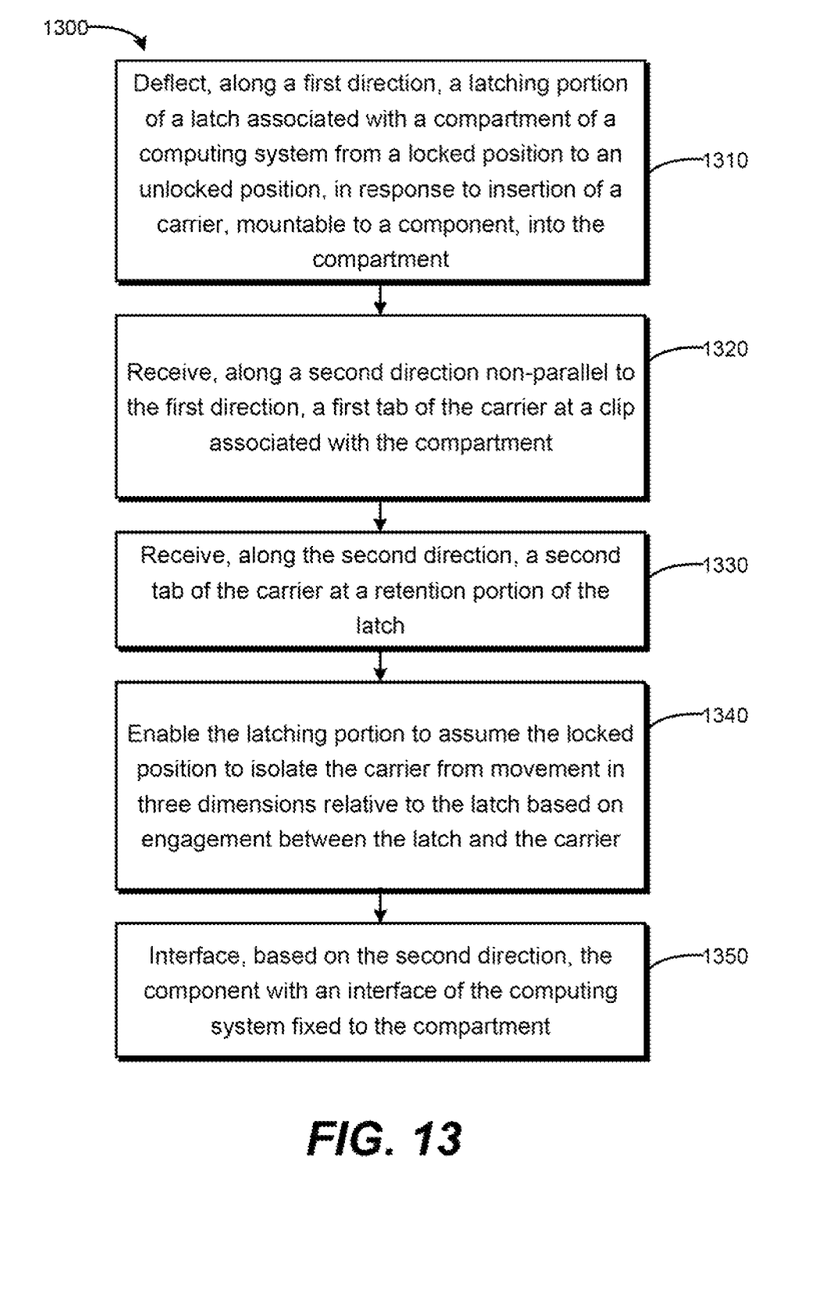
FIG. 13 is a flow chart based on isolating a carrier from movement in three dimensions according to an example.

FIG. 13 is a flow chart 1300 based on isolating a carrier from movement in three dimensions according to an example. In block 1310, a latching portion of a latch associated with a compartment of a computing system is to deflect, along a first direction, from a locked position to an unlocked position based on insertion of a carrier, mountable to a component, into the compartment. In block 1320, a plurality of clips associated with the compartment are to receive, along a second direction non-parallel to the first direction and away from the latch, a plurality of first tabs of the carrier. In block 1330, a retention portion of the latch is to receive, along the second direction, a plurality of second tabs of the carrier. In block 1340, the latching portion is to assume the locked position, based on resiliency of the latching portion, to isolate the carrier from movement in three dimensions based on engagement between the latch and the carrier. In block 1350, the component is to interface, based on the second direction, with an interface of the computing system fixed to the compartment.

What is claimed is:

1. A mounting system comprising:
    a carrier mountable to a component, including a first tab and a second tab, the carrier insertable into a compartment of a computing device along a first direction;
    a clip associated with the compartment to receive the first tab along a second direction non-parallel to the first direction; and
    a latch associated with the compartment including a latching portion deflectable along the first direction from a locked position to an unlocked position, in response to receiving the carrier in the compartment, wherein the carrier is movable along the second direction to enable the second tab to engage a retention portion of the latch, and the latching portion to assume the locked position, to isolate the carrier from movement in three dimensions relative to the latch.

2. The mounting system of claim 1, wherein the latching portion includes a depressible surface positioned at a height along the first direction greater than the retention portion to bias the latching portion toward the locked position, wherein the latching portion is deflectable to the unlocked position based on pressure received at the depressible surface.

3. The mounting system of claim 1, wherein the clip and the latch are each fastenable to the compartment using a fastener.

4. The mounting system of claim 3, wherein the tab includes a receptacle, and the clip is resilient and deflectable to bias the tab in contact with the fastener to receive at least a portion of the fastener at the receptacle to provide a friction fit between the first tab, fastener, and clip.

5. The mounting system of claim 1, wherein the carrier includes a side wall fastenable to a side of the component.

6. The mounting system of claim 1, wherein the carrier includes a floor fastenable to a bottom of the component.

7. The mounting system of claim 1, further comprising a carrier cover to cover a top of the component, wherein the cover includes a handle.

8. The mounting system of claim 1, wherein the first tab includes a tab ridge to oppose lateral movement between the carrier and clip.

9. The mounting system of claim 1, wherein the retention portion of the latch includes a retention ridge to oppose lateral movement between the carrier and the latch.

10. A computing system comprising:
- a compartment to receive, along a first direction, a carrier mountable to a component and insertable into the compartment;
- an interface fixed to the compartment to electrically connect the component to the computing system based on engagement between the interface and the component along a second direction non-parallel to the first direction;
- a clip associated with the compartment to receive a first tab of the carrier along the second direction; and
- a latch associated with the compartment including a latching portion deflectable along the first direction from a locked position to an unlocked position, in response to receiving the carrier in the compartment, wherein the carrier is movable along the second direction to enable the second tab to engage a retention portion of the latch, and the latching portion to assume the locked, position to isolate the carrier from movement in three dimensions relative to the latch.

11. The computing system of claim 10, wherein the interface is a blind mate interface (BMI).

12. The computing system of claim 10, wherein the carrier is mountable to a data storage component including at least one of a hard disk drive (HDD) and a solid-state drive (SSD).

13. The computing system of claim 10, wherein the latch and clip is comprised of sheet metal.

14. A method, comprising:
- deflecting, along a first direction, a latching portion of a latch associated with a compartment of a computing system from a locked position to an unlocked position, in response to insertion of a carrier, mountable to a component, into the compartment;
- receiving, along a second direction non-parallel to the first direction, a first tab of the carrier at a clip associated with the compartment;
- receiving, along the second direction, a second tab of the carrier at a retention portion of the latch; and
- enabling the latching portion to assume the locked position to isolate the carrier from movement in three dimensions relative to the latch based on engagement between the latch and the carrier.

15. The method of claim 14, further comprising interfacing, based on the second direction, the component with an interface of the computing system fixed to the compartment.

* * * * *

UNITED STATES PATENT AND TRADEMARK OFFICE
CERTIFICATE OF CORRECTION

PATENT NO. : 8,654,525 B2  
APPLICATION NO. : 13/364508  
DATED : February 18, 2014  
INVENTOR(S) : Thomas Aaron Bondurant et al.

Page 1 of 1

It is certified that error appears in the above-identified patent and that said Letters Patent is hereby corrected as shown below:

In the Claims

In column 9, line 24, in Claim 10, delete "locked," and insert -- locked --, therefor.

Signed and Sealed this
Eighth Day of July, 2014

Michelle K. Lee
*Deputy Director of the United States Patent and Trademark Office*